(12) United States Patent
Kommrusch et al.

(10) Patent No.: US 7,039,819 B1
(45) Date of Patent: May 2, 2006

(54) APPARATUS AND METHOD FOR INITIATING A SLEEP STATE IN A SYSTEM ON A CHIP DEVICE

(75) Inventors: Steven J. Kommrusch, Fort Collins, CO (US); Mark A. Landguth, La Jolla, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 510 days.

(21) Appl. No.: 10/426,487

(22) Filed: Apr. 30, 2003

(51) Int. Cl.
*G06F 1/32* (2006.01)

(52) U.S. Cl. ..................................... 713/322; 713/320

(58) Field of Classification Search ......... 713/300–324
See application file for complete search history.

(56) References Cited

U.S. PATENT DOCUMENTS

| | | | |
|---|---|---|---|
| 5,167,024 A | 11/1992 | Smith et al. | |
| 5,768,602 A | 6/1998 | Dhuey | |
| 5,978,923 A | 11/1999 | Kou | |
| 6,446,213 B1 | 9/2002 | Yamaki | |
| 6,535,982 B1* | 3/2003 | Kawabe et al. | 713/300 |
| 6,665,802 B1* | 12/2003 | Ober | 713/320 |
| 2003/0196127 A1* | 10/2003 | Olsen | 713/300 |
| 2004/0268278 A1* | 12/2004 | Hoberman et al. | 716/5 |
| 2005/0094036 A1* | 5/2005 | Tichelaar | 348/730 |

\* cited by examiner

*Primary Examiner*—Dennis M. Butler

(57) ABSTRACT

An apparatus and method is disclosed for initiating a sleep state in a system-on-a-chip (SOC) device. The apparatus comprises a bus controller coupled to a central processing unit (CPU) and a power management controller that is coupled to the bus controller and to a plurality of SOC modules. The power management controller sends control signals to the bus controller and to the SOC modules to coordinate the shutting down of power to the SOC modules during a process in which the power management controller places the SOC modules of the system-on-a-chip (SOC) device into a sleep state.

18 Claims, 6 Drawing Sheets

APPARATUS AND METHOD FOR INITIATING A SLEEP STATE IN A SYSTEM ON A CHIP DEVICE

TECHNICAL FIELD OF THE INVENTION

The present invention is generally directed to data processing systems and, in particular, to an apparatus and method in a data processing system for initiating a sleep state in a system-on-a-chip device.

BACKGROUND OF THE INVENTION

In recent years, there have been great advancements in the speed, power, and complexity of integrated circuits, such as application specific integrated circuit (ASIC) chips, random access memory (RAM) chips, microprocessor (μP) chips, and the like. These advancements have made possible the development of system-on-a-chip (SOC) devices. An SOC device integrates into a single chip many of the components of a complex electronic system, such as a wireless receiver (i.e., cell phone, a television receiver, and the like). SOC devices greatly reduce the size, cost, and power consumption of the system.

System-on-a-chip (SOC) data processors are characterized by a very high degree of integration on a single integrated circuit (IC) chip. Many of the peripheral components now integrated onto the same IC chip as a processor core would have been implemented as separate IC chips in a previous generation of processors. Advantageously, this decreases the amount of board space required, reduces the effects of noise, allows for low-voltage operations, and, in many cases, reduces the pin count of the SOC device.

Efficient power management in electronic systems is very important. The need to conserve electrical power is especially important in battery operated computer systems such as those used in laptop and handheld computers. Power management technologies are continually being developed and improved to enable end users to efficiently operate computer systems and promote power conservation. A power management module in a computer system is capable of turning off one or more computer subsystems when those computer subsystems have not been used for a specified period of time. The power management module determines the amount of time that the computer systems are turned off and the frequency with which the computer systems are turned off. The operating parameters of the power management module may be based on the preferences of the end user, application needs, and the system hardware capabilities.

Advanced Configuration and Power Interface (ACPI) is an open industry specification that has been developed by a consortium of computer manufacturing companies. The ACPI specification establishes industry standard interfaces for operating system configurations and power management systems.

The ACPI specification defines control interfaces and power state definitions. The ACPI specification defines a number of different power states for devices, buses, and data processor units. The ACPI power states are as follows: State "S0" is a working state. In State S0 the computer is on and the CPU is running. Power conservation in State S0 is on a "per device" basis. State "S1" is a sleep state. The computer appears off and the CPU is stopped. Random access memory (RAM) is refreshed and the system is running in a low power mode.

State "S2" is also a sleep state. The computer appears off and the CPU has no power. RAM is refreshed and the system is running in a lower power mode than the S1 sleep state. State "S3" is a deeper sleep state. The computer appears off and the CPU has no power. RAM is in slow refresh. The power supply is in a reduced power mode.

State "S4" is a "hibernate" state. The computer appears off. The computer hardware is completely off. The system memory has been saved to disk. State "S5" is an "off" state. The computer is off. The operating system has been shut down. Nothing has been saved. The "off" state requires a complete reboot to return to the working state (i.e., the S0 state).

The ACPI specification also defines four (4) processor power states for the CPU. The ACPI processor power states are as follows: State "C0" is a working state. In State C0 the CPU is on and executes instructions. State "C1" is an "Autohalt" state. The CPU enters State C1 when the CPU receives a "suspend on halt" instruction. Power consumption during State C1 is typically less than one watt (1 W). In State C1 the CPU is able to service cache snoops and interrupts. When a cache snoop or interrupt is detected, the CPU must temporarily "wake up" (i.e., return to State S0) to service the cache snoop or interrupt. The CPU then returns to State C1.

The next lower processor power state is State "C2". State C2 is a "Quick Start" state. State C2 has an exit latency of approximately one microsecond (1 μs). Power consumption during State C2 is typically less than five hundred milliwatts (500 mW). In State C2 the CPU is able to service caches snoops but not interrupts. The interrupts are blocked by a chipset module.

The next lower processor power state is State "C3". State C3 is a "Deep Sleep" state. State C3 has an exit latency of approximately one hundred microseconds (100 μs). Power consumption during State C3 is typically less than two hundred fifty milliwatts (250 mW). In State C3 the CPU is not able to service caches snoops or interrupts. The cache snoops and interrupts are blocked by a chipset module.

In a system-on-a-chip (SOC) integrated circuit (IC) many peripheral components are fabricated within the same silicon portion of the IC chip as the central processing unit (CPU). This feature makes the process of powering down the SOC integrated circuit chip more complicated that it would otherwise be if the peripheral components were external to the SOC integrated circuit chip. Because the central processing unit (CPU) and the peripheral components are located on the same silicon portion of the integrated circuit chip a software process is not capable of cleanly shutting down the various SOC modules. It is necessary to employ hardware to coordinate the shutting down of power to the various SOC modules as they are placed in a sleep state.

Therefore, there is a need in the art for an apparatus and method that is capable of efficiently initiating a sleep state in a system-on-a-chip (SOC) device. Specifically, there is a need in the art for an apparatus and method that is capable of employing hardware to coordinate the shutting down of power to various modules of a system-on-a-chip (SOC) device while the system-on-a-chip (SOC) device is being placed into a sleep state.

SUMMARY OF THE INVENTION

To address the deficiencies of the prior art discussed above, it is a primary object of the present invention to provide a data processing system that is capable of efficiently initiating a sleep state in a system-on-a-chip (SOC) device. It is also a primary object of the present invention to provide an apparatus and method capable of employing hardware to coordinate the shutting down of power to various modules of a system-on-a-chip (SOC) device while the system-on-a-chip (SOC) device is being placed into a sleep state.

The apparatus and method of the present invention is designed for use in a data processing system that comprises a system-on-a-chip (SOC) device having a central processing unit (CPU) and a plurality of system-on-a-chip (SOC) modules. An advantageous embodiment of the present invention comprises a bus controller that is coupled to the CPU. A power management controller is coupled to the bus controller and is also coupled to a plurality of SOC modules. The power management controller is capable of sending control signals to the bus controller and to the plurality of SOC modules to coordinate the shutting down of power to the SOC modules when the CPU or the power management controller initiates a sleep state in the system-on-a-chip (SOC) device.

It is an object of the present invention to provide an apparatus and method for shutting down power to a plurality of SOC modules in a system-on-a-chip (SOC) device.

It is also an object of the present invention to provide a bus controller and a power management controller that are capable of efficiently coordinating a shut down of power to a plurality of SOC modules when a system-on-a-chip (SOC) device is placed in a sleep state.

It is another object of the present invention to provide a bus controller having a plurality of power management machine specific registers that are capable of containing addresses and instructions that enable the bus controller to coordinate a shut down of power to a plurality of SOC modules.

It is still another object of the present invention to provide a power management controller that is capable of sending clock disable signals to each SOC module of a plurality of SOC modules when the power management controller coordinates a shut down of power to the plurality of SOC modules.

It is also an object of the present invention to provide a power management controller that is capable of waiting to receive an acknowledgement signal from each SOC module of a plurality of SOC modules where each acknowledgement signal indicates that a clock disable process has been completed in its respective SOC module.

It is another object of the present invention to provide a power management controller that is capable of sending a signal to gate off all clock signals in each SOC module, and that is capable of sending a signal to turn off all on-chip phase locked loop circuits and on-chip digital to analog converters.

It is also an object of the present invention to provide an off-chip controller that is capable of asserting external control signals to control external power switches, and that is capable of shutting off power to each SOC module in an SOC device when the SOC device is placed in a sleep state.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system-on-a-chip (SOC) device.

Figure 1:
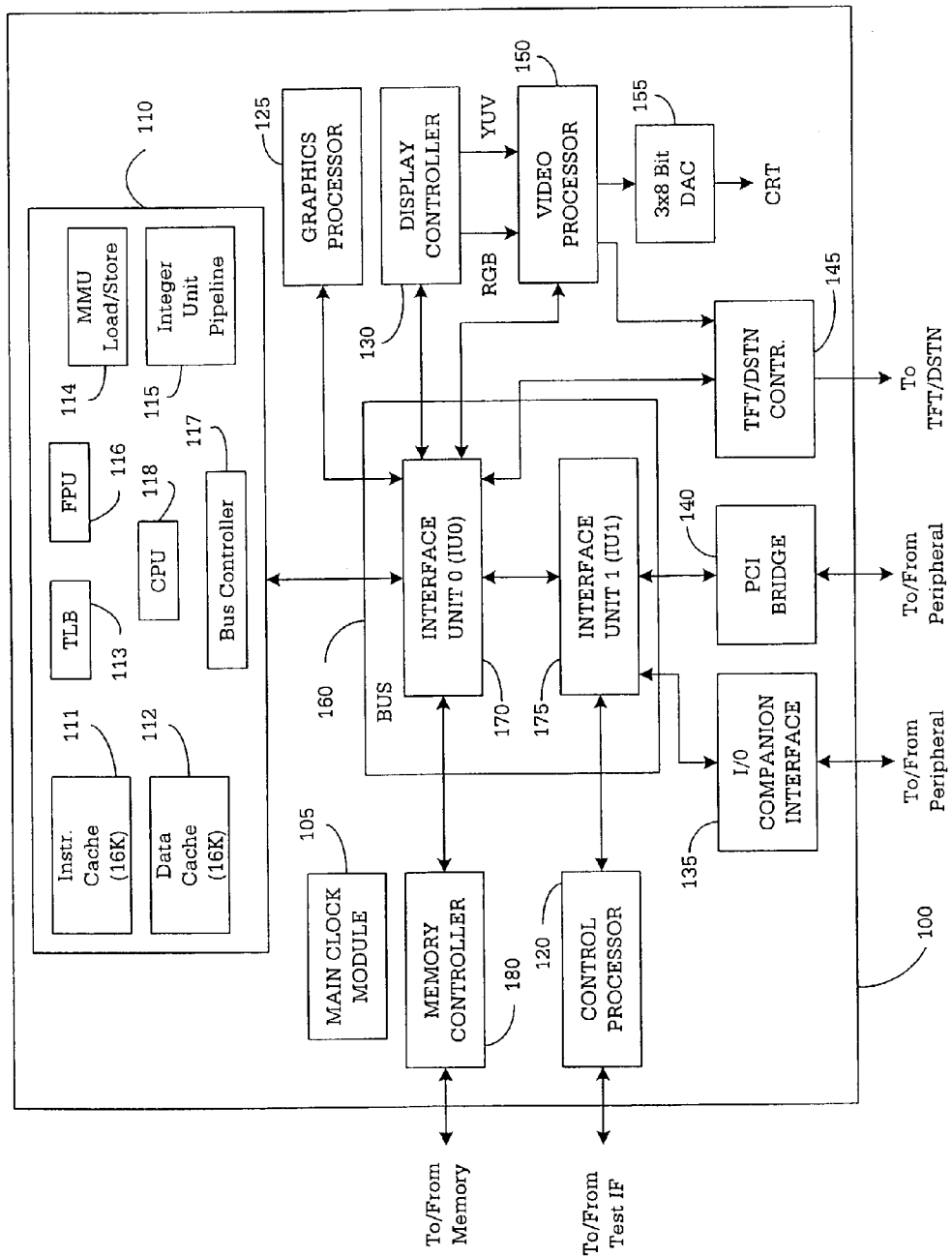
FIG. 1 illustrates an exemplary data processing system according to an advantageous embodiment of the present invention.

FIG. 1 illustrates exemplary data processing system 100 according to one embodiment of the present invention. In the exemplary embodiment, data processing system 100 is a highly integrated system-on-a-chip (SOC) device designed to power information appliances (IA) for entertainment, educational, and/or business purposes. However, this is by way of illustration only and those skilled in the art will recognize that the present invention may be integrated into other types of SOC devices, such as cell phone transceivers, television receivers, radio receivers, and the like.

Data processing system 100 comprises main clock module 105, central processing unit (CPU) core 110, control processor 120, graphics processor 125, display controller 130, input/output (I/O) companion interface (IF) 135, Peripheral Component Interconnect (PCI) bridge 140, TFT/DSTN controller 145, video processor 150, three (3)×eight (8) bit digital to analog converter (DAC) 155, internal bus 160, and memory controller 180.

CPU core 110 comprises instruction cache 111, data cache 112, translation look-aside buffer (TLB) 113, memory management unit (MMU) load/store block 114, integer unit (IU) pipeline 115, floating point unit (FPU) 116, and bus controller 117. In order to more clearly describe the operation of the present invention, the elements of CPU core 110 other than bus controller 117 will be collectively referred to as central processing unit 118 (CPU 118).

According to an exemplary embodiment of the present invention, instruction cache 111 is sixteen (16) kilobytes and data cache 112 is sixteen (16) kilobytes. Internal bus 160 comprises interface unit 0 (IU0) 170 and interface unit 1 (IU1) 175.

According to an exemplary embodiment of the present invention, CPU core 110 is an x86 compatible device and FPU 116 is an x87 compatible device. The instruction set supported by CPU core 110 may be a combination of the instruction sets implemented by the Intel Pentium™ processor, the AMD™ K6 and K7 processors, and the National Semiconductor Corporation™ (NSC) GX1 processor.

Integer unit pipeline 115 comprises an instruction pipeline and associated logic. According to an exemplary embodiment, integer unit pipeline 115 consists of a single-issue eight-stage pipeline. The eight stages of the instruction pipeline in integer unit pipeline 115 are:

1) Instruction Pre-fetch stage;
2) Instruction Pre-decode stage;
3) Instruction Decode stage;
4) Instruction Queue stage;
5) Address Calculation 1 stage;
6) Address Calculation 2 stage;
7) Execution Unit stage; and
8) Writeback stage.

In the Instruction Pre-fetch stage, the raw instruction is fetched from the instruction memory cache. The Instruction Pre-decode stage extracts prefix bytes from the raw instruction bits. The pre-decode operation looks-ahead to the next instruction and a potential bubble can be eliminated if the pipeline stalls downstream. The Instruction Decode stage performs full decode of the instruction data and indicates the instruction length back to the Pre-fetch stage, thereby allowing the Pre-fetch stage to shift the appropriate number of bytes to the beginning of the next instruction.

The Instruction Queue stage comprises a FIFO containing decoded x86 instructions. The Instruction Queue allows the Instruction Decode stage to proceed even if the pipeline is stalled downstream. Register read operations for data operand address calculations are performed in the Instruction Queue stage. The Address Calculation 1 stage computes the linear address of operand data (if required) and issues requests to data cache 112. Microcode can take over the pipeline and inject a micro-box if multi-box instructions require additional data operands. In Address Calculation 2 stage, operand data (if required) is returned and set up to the Execution Unit stage with no bubbles if there was a data cache hit. Segment limit checking also is performed on the data operand address. The micro-read-only-memory (μROM) is read for setup to Execution Unit stage.

In the Execution Unit stage, register and/or data memory fetches are fed through the Arithmetic Logic Unit (ALU) for arithmetic or logical operations. The μROM always fires for the first instruction box into the pipeline. Microcode may control the pipeline and insert additional boxes in the Execution Unit stage if the instruction requires multiple Execution Unit stages to complete. The Writeback stage writes results of the Execution Unit stages to the register file or to data memory.

The memory subsystem of CPU core 110 supplies integer unit pipeline 115 with instructions, data, and translated addresses. To support efficient delivery of instructions, the memory subsystem uses instruction cache 111 and TLB 113. According to an exemplary embodiment of the present invention instruction cache 111 may be a single clock access, sixteen kilobyte (16 KB), four (4) way set associative cache and TLB 113 may be an eight (8) entry, fully associative, translation look-aside buffer for data and an eight (8) entry, fully associative, translation look-aside buffer for instructions. TLB 113 performs necessary address translations when in protected mode.

TLB 113 may also comprise a second-level (L2) unified (instruction and data), sixty four (64) entry, two (2) way set associative TLB that is accessed when there is a miss to the instruction TLB or the data TLB. The L2 unified TLB takes an additional clock to access. When there is a miss to the instruction or data caches or the TLB, the access must go to memory controller 180 for processing. The use of instruction cache 111, data cache 112 and their associated TLB in TLB 113 improves the overall efficiency of integer unit pipeline 115 by enabling simultaneous access to both instruction cache 111 and data cache 112.

Floating point unit (FPU) 116 is a pipelined arithmetic unit that performs floating point operations in accordance with the IEEE 754 standard. FPU 116 is a pipelined machine with dynamic scheduling of instructions to minimize stalls due to data dependencies. FPU 116 performs out-of-order execution and register renaming. FPU 116 is designed to support an instruction issue rate of one instruction per clock from the integer core. The data path is optimized for single precision arithmetic. Extended precision instructions are handled in microcode and require multiple passes through the pipeline. According to an exemplary embodiment, FPU 116 comprises an execution pipeline and a load/store pipeline, thereby enabling load/store operations to execute in parallel with arithmetic instructions.

Control processor 120 is responsible for reset control, macro-clock management, and debug support provided in data processing system 100. Control processor 120 comprises a JTAG interface and the scan chain control logic. Control processor 120 supports chip reset, which includes initial phase-locked loop (PLL) control and programming, and runtime power management macro-clock control. The JTAG support includes a TAP controller that is IEEE 1149.1 compliant. CPU control can be obtained through the JTAG interface into the TAP Controller, and all internal registers, including CPU core 110 registers, may be accessed. Incircuit emulation (ICE) capabilities are supported through the JTAG and TAP Controller interface.

As noted above, internal bus 160 comprises two interface units: IU0 170 and IU1 175. IU0 170 connects six (6) high-speed modules together with a seventh link to IU1 175. IU1 175 connects to three (3) low-speed modules, namely I/O companion IF 135, PCI bridge 140, and TFT/DSTN controller 145.

Memory controller 180 is the memory source for all memory accesses in data processing system 100. Memory controller 180 supports a memory data bus width of sixty four (64) bits. Memory controller 180 supports two types of memory. The first type of memory is a 111 MHz 222 MT/S for DDR (Dual Data Rate). The second type of memory is a 133 MHz for SDR (Single Data Rate). Memory controller 180 supports up to one gigabyte (1 GB) of either SDR memory or DDR memory.

The modules that need access to memory are CPU core 110, graphics processor 125, display controller 130, and TFT/DSTN controller 145. Because memory controller 180 supports memory needs for both CPU core 110 and the display subsystem, memory controller 180 is classically referred to as a Unified Memory Architecture (UMA) memory subsystem. According to an exemplary embodiment of the present invention, graphics processor 125 is a BitBLT/vector engine that supports pattern generation, source expansion, pattern/source transparency, and 256 ternary raster operations.

Display controller 130 performs the following functions: 1) retrieval of graphics, video, and overlay streams from the frame buffer; 2) serialization of the streams; 3) any necessary color look-ups and output formatting; and 4) interfacing with the display filter for driving the display device(s) (not shown). Display controller 130 may comprise a graphical user interface (GUI) and a VGA, which provides full hardware compatibility with the VGA graphics standard. The VGA passes eight (8) bit pixels and sync signals to the GUI, which expands the pixels to twenty four (24) BPP via the color lookup table and passes the information to video processor 150. Video processor 150 ultimately generates the digital red, green, and blue signals and buffers the sync signals, which are then sent to DAC 155 or the flat panel interface.

Video processor 150 mixes the graphics and video streams, and outputs digital RGB data to DAC 155 or the flat panel interface, depending upon the part (i.e., cathode ray tube (CRT) or flat panel (FP)). Video processor 150 is capable of delivering high resolution and true color graphics. Video processor 150 may also overlay or blend a scaled true color video image on the graphics background.

TFT/DSTN controller 145 converts the digital RGB output of a video mixer block to the digital output suitable for driving a dual-scan color STN (DSTN) flat panel LCD. TFT/DSTN controller 145 connects to the digital RGB output of video processor 150 and drives the graphics data onto a dual-scan flat panel LCD. According to an exemplary embodiment, TFT/DSTN controller 145 may drive all standard dual-scan color STN flat panels up to 1024×768 resolution.

PCI bridge 140 contains all the necessary logic to support a standard external PCI interface. The PCI interface is PCI 2.2 specification compliant. PCI bridge 140 comprises the PCI and Interface Unit control, read and write FIFOs, and a PCI arbiter. I/O companion IF 135 handles several unique signals that support system reset, system interrupts, and power system managements.

Figure 2:
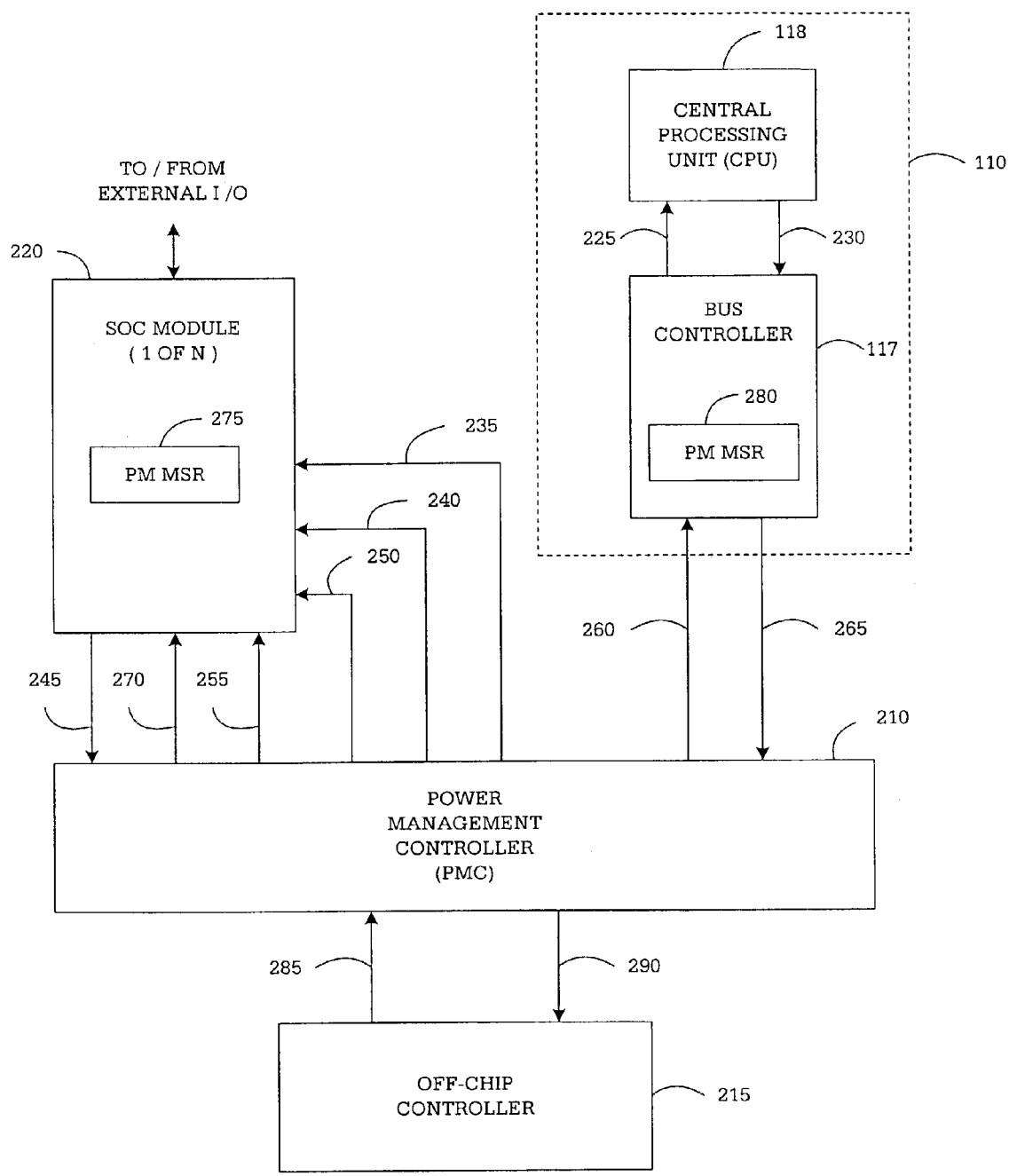
FIG. 2 illustrates portion of the data processing system shown in FIG. 1 showing a central processing unit, a bus controller, a power management controller, an off-chip controller, and a plurality of system-on-a-chip (SOC) modules according to an advantageous embodiment of the present invention.

FIG. 2 illustrates a portion of data processing system 100 in more detail showing an advantageous embodiment of the present invention. FIG. 2 illustrates central processing unit (CPU) core 110 comprising bus controller 117 and central processing unit 118 (CPU 118). FIG. 2 also illustrates power management controller 210, off-chip controller 215, and system-on-a-chip (SOC) module 220. SOC module 220 represents a plurality of SOC modules that are each coupled to bus 160 (not shown in FIG. 2). That is why SOC module 220 is denoted (1 of N) to indicate that it is one of N such SOC modules. Central processing unit (CPU) 118, bus controller 117, power management controller 210, off-chip controller 215, and SOC modules 220 communicate through the various signal lines shown in FIG. 2. The individual signal lines and the signals that they carry will be more fully described below.

Power management controller (PMC) 210 is an on-chip functional block. The functionality of PMC 210 is provided by main clock module 105, control processor 120, and I/O companion interface 135 of system-on-a-chip (SOC) device 100. These elements of PMC 210 are shown in FIG. 1. PMC 210 is capable of receiving a signal from an external source that requests PMC 210 to put the system-on-a-chip (SOC) device 100 into a sleep state. For example, PMC 210 can receive a signal requesting a sleep state from off-chip controller 215 on signal line 285. Alternatively, CPU 118 is capable of deciding to initiate the process of putting SOC device 100 into a sleep state.

In one exemplary embodiment of the present invention, CPU 118 decides to initiates a sleep state for SOC device 100. CPU 118 then executes software to shut down all of the SOC modules 220 that can be shut down with software instructions. CPU 118 sends signals to bus controller 117 on signal line 230 and receives signals from bus controller 117 on signal line 225. CPU 118 sets up Power Management (PM) Machine Specific Registers (MSR) 280 in bus controller 117. The Power Management (PM) MSR registers 280 contain addresses and specify additional "power off" actions to be taken.

CPU 118 also sets up Power Management (PM) Machine Specific Registers (MSR) 275 in the SOC modules 220. CPU 118 then sends a signal to off-chip controller 215 (through bus controller 117) that notifies off-chip controller 215 that CPU 118 is ready for a hardware shutdown process.

Bus controller 117 sends signals to PMC 210 on signal line 265 and receives signals from PMC 210 on signal line 260. PMC 210 sends signals to off-chip controller 215 on signal line 290 and receives signals from off-chip controller 215 on signal line 285. Off-chip controller 215 may be implemented either in hardware, or in software, or in a combination of hardware and software. In response to receiving the "hardware shutdown ready" signal from CPU 118, off-chip controller 215 sends a sleep request signal (denoted "slp_req") to PMC 210 on signal line 285. PMC 210 sends the sleep request signal (denoted "slp_req") to bus controller 117 on signal line 260. In response, bus controller 117 sends a suspension request signal (denoted "suspend_req") to CPU 118 on signal line 225. CPU 118 responds to the suspension request signal by entering a sleep state (e.g., ACPI State C2) and sending an acknowledgement signal (denoted "suspend_ack") back to bus controller 117 on signal line 230. Bus controller 117 sends the "suspend_ack" acknowledgment signal to PMC 210 on signal line 265.

After PMC 210 receives the "suspend_ack" acknowledgment signal from CPU 118 (via bus controller 117), PMC 210 asserts a clock disable request signal (denoted "clk_dis_req") to each of the N SOC modules 220. As previously mentioned, each of the N SOC modules 220 contain Power Management (PM) MSR registers 275. In the advantageous embodiment of the invention shown in FIG. 2, PMC 210 sends the "clk_dis_req" signal to each of the N SOC modules 220 on signal line 235. PMC 210 then monitors a "qualified" shut down of the clocks in each of the N SOC modules 220. The shut down is "qualified" in that PMC 210 waits to receive an acknowledgement signal (i.e., a de-assertion of a "d_clk_active" signal) from each SOC module 220 on signal line 245 that the clock in the SOC module has been shut down.

After PMC 210 has received an acknowledgement signal from each SOC module 220, then PMC 210 sends a sleep state acknowledgement signal (denoted "slp_ack") to off-chip controller 215 on signal line 290 acknowledging the sleep request signal ("slp_req"). Alternatively, PMC 210 may wait for a selected time period (i.e., a programmable delay period) and assume that each of the SOC modules 220 has completed its clock disable process during the selected time period. If this alternative method is used, then each of the actual values of the signal "d_clk_active" is treated as a "don't care" value in the logic. In the alternative method, PMC 210 sends the sleep state acknowledgement signal ("slp_ack") to off-chip controller 215 on signal line 290 after the expiration of the selected time period.

PMC 210 comprises "power down" logic that waits for all the "on-chip" SOC modules 220 specified in the PM MSR registers 280 to go idle. The SOC modules 220 may be, for example, Graphics Processor (GP) modules, Peripheral Component Interface (PCI) modules, Video modules, Memory Controller modules, etc. Off-chip controller 215 then sends to PMC 210 on signal line 285 a global signal (denoted "slp_io_in_dis_glbl") to signal to PMC 210 to disable inputs to the SOC modules 220 during the sleep state operation. PMC 210 then sends a block specific signal (denoted "slp_io_in_dis") to each SOC module 220 on signal line 240 to disable selected inputs during the sleep state operation. PMC 210 then gates off all clock signals (denoted "d_func_clk") for the SOC modules 220 on signal line 250. PMC 210 is also capable of asserting (and de-asserting) an enable signal (denoted "d_func_en") to each SOC module 220 on signal line 255.

PMC 210 then turns off all "on-chip" phase locked loop (PLL) circuits, digital to analog converters (DAC), etc. Off-chip controller 215 then sends to PMC 210 on signal line 285 a global signal (denoted "slp_io_out_dis_glbl") to signal to PMC 210 to disable outputs to the SOC modules 220 during the sleep state operation. PMC 210 then sends a block specific signal (denoted "slp_io_out_dis") to each SOC module 220 on signal line 270 to disable selected outputs during the sleep state operation.

Off-chip processor 215 may then assert an external control signal (denoted "slp_clk") to turn off all system clocks. After the system clocks have been turned off, off-chip controller 215 then shuts off the power to SOC device 100.

Figure 3:
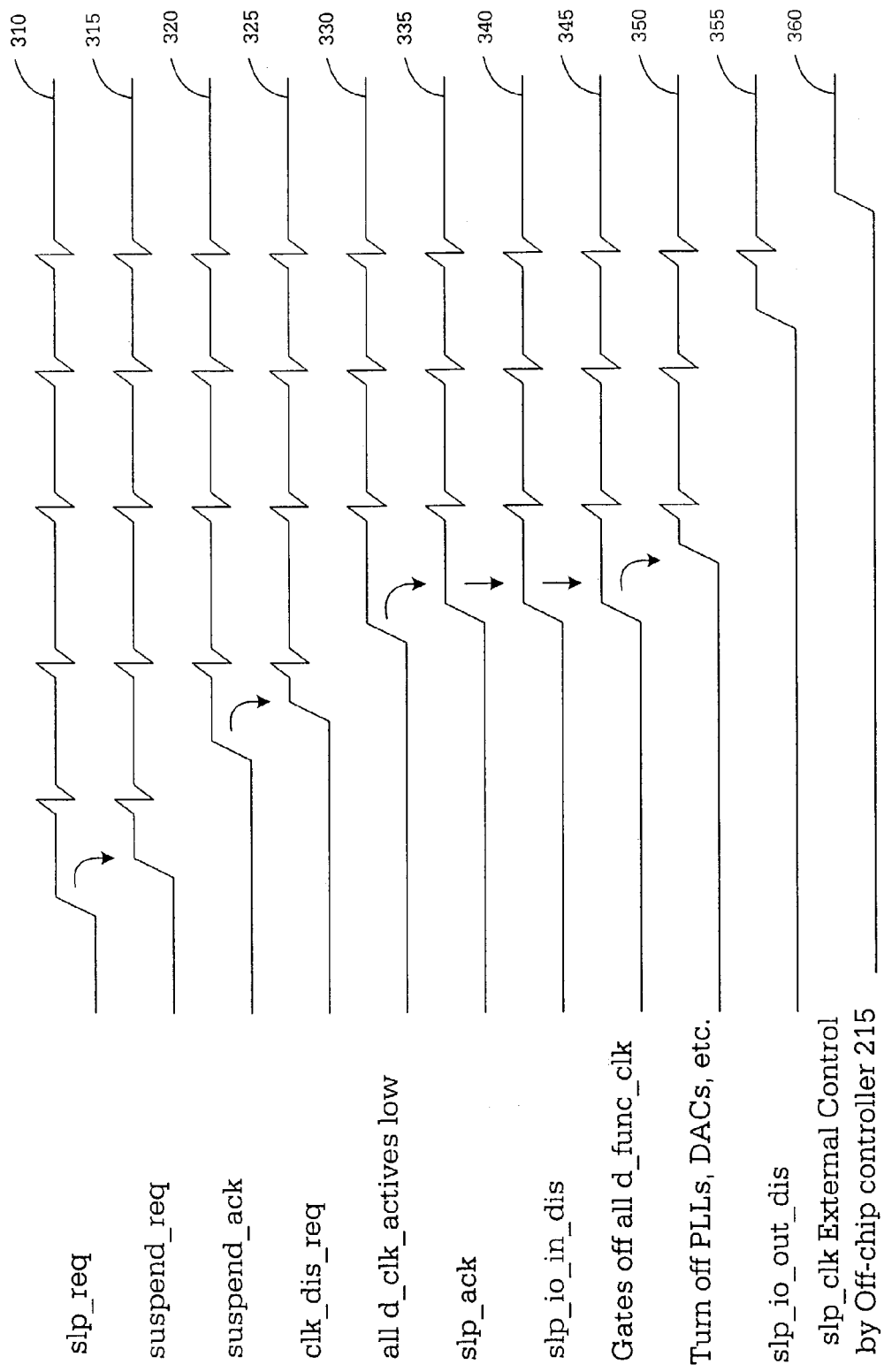
FIG. 3 illustrates a timing diagram showing a sequence of initiation of a plurality of signals according to an advantageous embodiment of the present invention.

FIG. 3 illustrates a timing diagram showing the sequence of initiation of the signals described with reference to FIG. 2 above. Signal 310 shows the assertion of the signal "slp_req" by PMC 210 to bus controller 117. Signal 315 shows the assertion of the signal "suspend_req" by bus controller 117 to CPU 118. The curved arrow between signal 310 and signal 315 indicates that the assertion of signal 315 follows the assertion of signal 310 within one to three clocks. The actual number of clocks is not critical. Similarly, each of the other arrows in FIG. 3 (straight or curved) indicates that the assertion of the second signal follows the assertion of the first signal within one to three clocks. The actual number of clocks is not critical. Each of the jagged portions of the signals shown in FIG. 3 represents a variable delay period.

Signal 320 shows the assertion of the signal "suspend_ack" by CPU 118 to bus controller 117 (and to PMC 210). Signal 325 shows the assertion of the signal "clk_dis_req" by PMC 210. Signal 330 shows the assertion of a signal by PMC 210 that indicates that each of the "d_clk_active" signals from each of the SOC modules 220 has been de-asserted. Signal 335 shows the assertion of the signal "slp_ack" by PMC 210.

Signal 340 shows the assertion of the signal "slp_io_in_dis" by PMC 210. Signal 345 shows the assertion of a signal by PMC 210 that indicates that each of the clock signals "d_func_clk" from each of the SOC modules 220 has been gated off by PMC 210. Signal 350 shows the assertion of the signal that shows that PMC 210 has turned off the "on-chip" phase locked loop (PLL) circuits, digital to analog converter (DAC) circuits, etc. Signal 355 shows the assertion of the signal "slp_io_out_dis" by PMC 210. Signal 360 shows the assertion of the external control signal "slp_clk" by off-chip controller 215 to turn off the system clocks.

Figure 4:
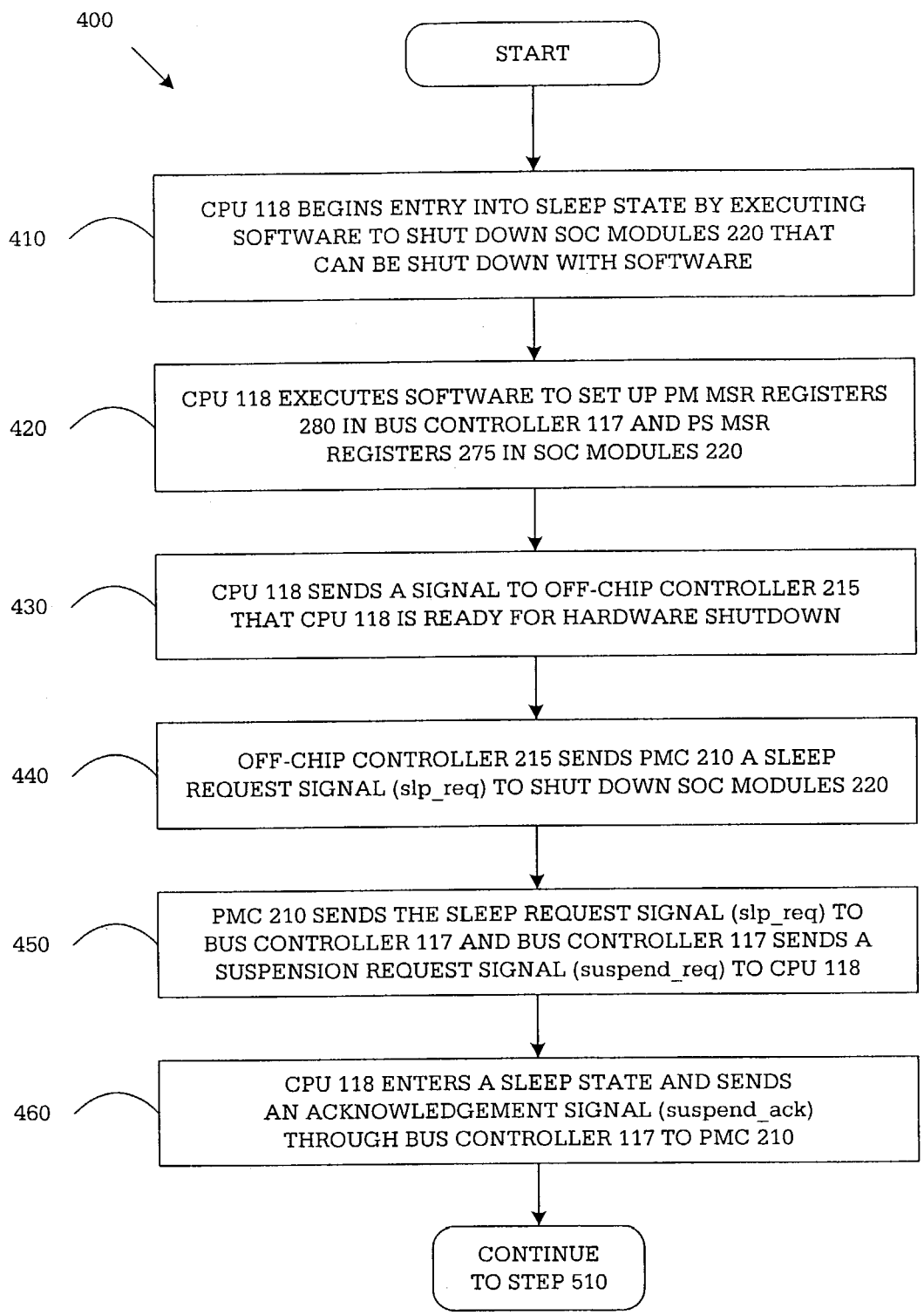
FIG. 4 illustrates a flow chart showing the operation of an advantageous embodiment of a first portion of the method of the present invention.

FIG. 4 illustrates a flow chart showing the operation of an advantageous embodiment of a first portion of the method of the present invention. The steps of the first portion of the method shown in FIG. 4 are generally denoted with reference numeral 400.

Central processing unit (CPU) 118 begins an entry into a sleep state for SOC device 100 by executing software to shut down the SOC modules that can be shut down with software (step 410). CPU 118 then executes software to set up Power Management (PM) MSR registers 280 in bus controller 117 and Power Management (PM) MSR registers in SOC modules 220 (step 420). CPU 118 then sends a signal to off-chip controller 215 that informs off-chip controller 215 that CPU 118 is ready for a hardware shutdown (step 430).

Off-chip controller 215 then sends a sleep request signal ("slp_req") to PMC 210 to request PMC 210 to shut down the SOC modules (step 440). PMC 210 sends the sleep request signal ("slp_req") to bus controller 117 and bus controller sends a suspension request signal ("suspend_req") to CPU 118 (step 450). In response, CPU 118 enters a sleep state (e.g., ACPI State C2) and sends an acknowledgement signal ("suspend_ack") through bus controller 117 to PMC 210 (step 460). Control then passes to step 510 of the method as shown in FIG. 5.

Figure 5:
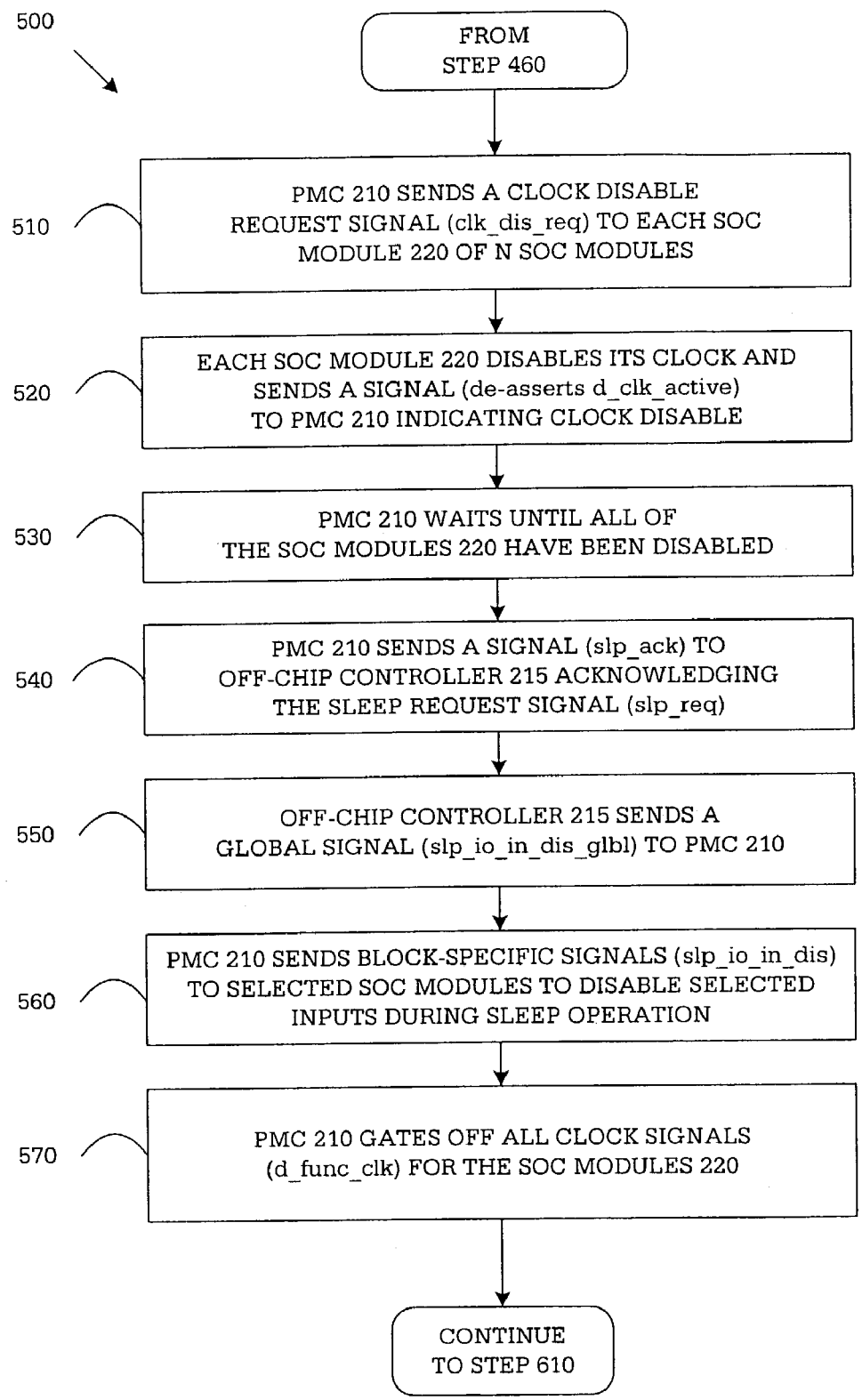
FIG. 5 illustrates a flow chart showing the operation of an advantageous embodiment of a second portion of the method of the present invention.

FIG. 5 illustrates a flow chart showing the operation of an advantageous embodiment of a second portion of the method of the present invention. The steps of the second portion of the method shown in FIG. 5 are generally denoted with reference numeral 500.

Control passes from step 460 of the method as shown in FIG. 4. PMC 210 sends a clock disable request signal ("clk_dis_req") to each SOC module 220 of the N SOC modules (step 510). Each SOC module 220 disables its clock and sends a signal ("d_clk_active" de-asserted) to PMC 210 indicating that the SOC module clock has been disabled (step 520). PMC 210 then waits until the clocks of all of the SOC modules 220 have been disabled (step 530). Alternatively, PMC 210 waits for a predetermined period of time and assumes that all of the clocks of the SOC modules 220 have been disabled (this alternate step is not shown in FIG. 5).

PMC 210 then sends a signal ("slp_ack") to off-chip controller 215 acknowledging the sleep request signal ("slp_req") (step 540). Off-chip controller 215 then sends to PMC 210 a global signal (denoted "slp_io_in_dis_glbl") to signal to PMC 210 to disable inputs to the SOC modules 220 during the sleep state operation (step 550). PMC 210 then sends a block specific signal (denoted "slp_io_in_dis") to selected SOC modules 220 to disable selected inputs during the sleep state operation (step 560). PMC 210 then gates off all clock signals (denoted "d_func_clk") for the SOC modules 220 (step 570). Control then passes to step 610 of the method as shown in FIG. 6.

Figure 6:
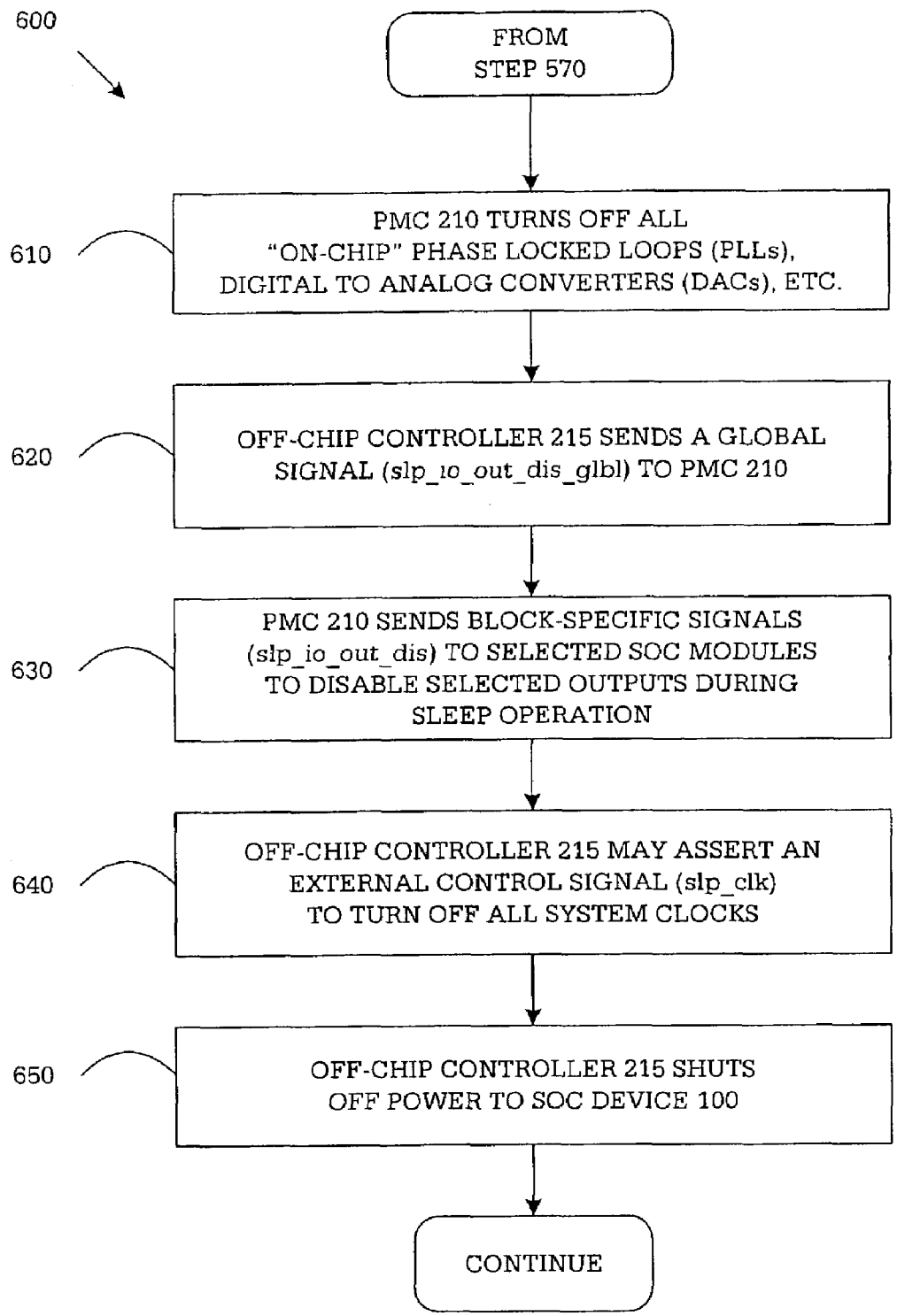
FIG. 6 illustrates a flow chart showing the operation of an advantageous embodiment of a third portion of the method of the present invention.

FIG. 6 illustrates a flow chart showing the operation of an advantageous embodiment of a third portion of the method of the present invention. The steps of the third portion of the method shown in FIG. 6 are generally denoted with reference numeral 600.

Control passes from step 570 of the method as shown in FIG. 5. PMC 210 then turns off all "on-chip" phase locked loop circuits (PLLs), digital to analog converters (DACs), etc. (step 610). Off-chip controller 215 then sends to PMC 210 a global signal (denoted "slp_io_out_dis_glbl") to signal to PMC 210 to disable outputs to the SOC modules 220 during the sleep state operation (step 620). PMC 210 then sends a block specific signal (denoted "slp_io_out_dis") to selected SOC modules 220 to disable selected outputs during the sleep state operation (step 630). Off-chip controller 215 then asserts an external control signal ("slp_clk") to turn off all system clocks (step 640). Off-chip controller 215 then shuts off power to SOC device 100 (step 650).

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a data processing system that comprises a system-on-a-chip (SOC) device that comprises a central processing unit and a plurality of system-on-a-chip (SOC) modules, an apparatus for initiating a sleep state in said system-on-a-chip (SOC) device in said data processing system, said apparatus comprising;
    a power management controller coupled to said central processing unit and to said plurality of SOC modules, said power management controller capable of:
        initiating a sleep state in said system-on-a-chip (SOC) device by sending a sleep request signal to said central processing unit to cause said central processing unit to enter a sleep state and by sending to each of said plurality of SOC modules a clock disable request signal to cause each of said plurality of SOC modules to enter a sleep state;
        receiving a suspension request acknowledgement signal from said central processing unit acknowledging that said central processing unit had entered a sleep state; and
        in response to receiving said suspension request acknowledgement signal from said central processing unit, sending a clock disable request signal to each of said plurality of SOC modules.

2. The apparatus as set forth in claim 1 further comprising a bus controller coupled to said central processing unit and to said power management controller, wherein said bus controller comprises a plurality of power management machine specific registers, and wherein said central processing unit is capable of entering information into said plurality of said power management machine specific registers in said bus controller to specify addresses and to specify actions for said power management controller to take when said power management controller executes steps of said initiation of said sleep state in said system-on-a-chip (SOC) device.

3. The apparatus as set forth in claim 1 wherein said power management controller is capable of one of: (1) waiting to receive an acknowledgement signal from each SOC module of said plurality of SOC modules, said acknowledgement signal from an SOC module acknowledging that a clock disable process in said SOC module has been completed, and (2) waiting for a selected time period and assuming that each SOC module has completed a clock disable process during said selected time period.

4. The apparatus as set forth in claim 3 further comprising an off-chip controller coupled to said power management controller that is capable of sending a sleep request signal to said power management controller, wherein said power management controller, in response to determining that each of said SOC modules has completed a clock disable process, is capable of sending a sleep state acknowledgement signal to said off-chip controller.

5. The apparatus as set forth in claim 4 wherein said power management controller is capable of sending a signal to each SOC module to disable inputs to said SOC module during said initiation of said sleep state of said system-on-a-chip (SOC) device, and said power management controller is capable of sending a signal to gate off all clock signals to each SOC module, and said power management controller is capable of sending a signal to turn off all on-chip phase locked loop circuits and on-chip digital to analog converters.

6. The apparatus as set forth in claim 5 wherein said off-chip controller is capable of sending an external control signal to turn off all system clocks, and is capable of shutting off power to each SOC module of said plurality of SOC modules.

7. A data processing system comprising a system-on-a-chip (SOC) device that comprises a central processing unit and a plurality of system-on-a-chip (SOC) modules, said data processing system comprising:
    an apparatus or initiating a sleep state in said system-on-a-chip (SOC) device in said data processing system, said apparatus comprising:
        a power management controller coupled to said central processing unit and to said plurality of SOC modules, said power management controller capable of:
            initiating a sleep state in said system-on-a-chip (SOC) device by sending a sleep request signal to said central processing unit to cause said central processing unit to enter a sleep state and by sending to each of said plurality of SOC modules a clock disable request signal to cause each of said plurality of SOC modules to enter a sleep state;
            receiving a suspension request acknowledgement signal from said central processing unit acknowledging that said central processing unit has entered a sleep state; and
            in response to receiving said suspension request acknowledgement signal from said central processing unit, sending clock disable request signal to each of said plurality of SOC modules.

8. The data processing system as set forth in Clam 7 further comprising a bus controller coupled to said central processing unit and to said power management unit, wherein said bus controller comprises a plurality of power management machine specific registers, and wherein said central processing unit is capable of entering information into said plurality of said power management machine specific registers to specify addresses and to specify actions for said power management controller to take when said power management controller executes steps of said initiation of said sleep state in said system-on-a-chip (SOC) device.

9. The data processing system as set forth in claim 7 wherein said power management controller is capable of one of: (1) waiting to receive an acknowledgement signal from each SOC module of said plurality of SOC modules, said acknowledgement signal from an SOC module acknowledging that a clock disable process in said SOC module has been completed, and (2) waiting for a selected time period and assuming that each SOC module has completed a clock disable process during said selected time period.

10. The data processing system as set forth in claim 9 further comprising an off-chip controller coupled to said power management controller that is capable of sending a sleep request signal to said power management controller, wherein said power management controller, in response to determining that each of said SOC modules has completed a clock disable process, is capable of sending a sleep state acknowledgement signal to said off-chip controller.

11. The data processing system as set forth in claim 10 wherein said power management controller is capable of sending a signal to each SOC module to disable inputs to said SOC module during said initiation of said sleep state of said system-on-a-chip (SOC) device, and said power management controller is capable of sending a signal to gate off all clock signals to each SOC module, and said power management controller is capable of sending a signal to turn off all on-chip phase locked loop circuits and on-chip digital to analog converters.

12. The data processing system as set forth in claim 11 wherein said off-chip controller is capable of sending an external control signal to turn off all system clocks, and is capable of shutting off power to each SOC module of said plurality of SOC modules.

13. For use in a data processing system that comprises a system-on-a-chip (SOC) device that comprises a central processing unit (CPU) and a plurality of system-on-a-chip (SOC) modules, a method for initiating a sleep state in said system-on-a-chip (SOC) device in said data processing system, said method comprising:
    initiating a sleep state in said system-on-a-chip (SOC) device by sending a sleep request signal from a power management controller to said CPU to cause said CPU to enter a sleep state;
    sending to each of said plurality of SOC modules a clock disable request signal from said power management controller to cause each of said plurality of SOC modules to enter a sleep state;
    receiving in said power management controller a suspension request acknowledgement signal from said central processing unit acknowledging that said central processing unit has entered a sleep state; and
    in response to receiving said suspension request acknowledgement signal from said central processing unit in said power management controller, sending a clock disable request signal from said power management controller to each of said plurality of SOC modules.

14. The method as set forth in claim 13 further comprising:
    sending information from said central processing unit to a plurality of power management machine specific registers in a bus controller coupled to said central processing unit and to said power management controller; said information specifying addresses and actions for said power management controller to take when said power management controller executes steps of said initiation of said sleep state in said s system-on-a-chip (SOC) device.

15. The method as set forth in claim 14 further comprising one of:
    said power management controller waiting to receive an acknowledgement signal from each SOC module of said plurality of SOC modules, said acknowledgement signal from an SOC module acknowledging that a clock disable process in said SOC module has been completed; or
    said power management controller waiting for a selected time period and assuming that each SOC module has completed a clock disable process during said selected time period.

16. The method as set forth in claim 15 further comprising: in response to determining in said bus controller that each of said SOC modules has completed a clock disable process, sending a sleep state acknowledgement signal from said power management controller to an off-chip controller coupled to said power management controller.

17. The method as set forth in claim 16 further comprising:
    sending a signal from said power management controller to each SOC module to disable inputs to said SOC module during said initiation of said sleep state of said system-on-a-chip (SOC) device;
    sending a signal power said power management controller to gate off au clock signals to each SOC module; and
    sending a signal from said power management controller to turn of all on-chip phase locked loop circuits and on-chip digital to analog converters.

18. The method as set forth in claim 17 further comprising:
    sending an external control signal from said off-chop controller to turn off all system clocks; and
    sending a signal from said off-chip controller to each SOC module of said plurality of SOC modules to shut off power to each SOC module of said plurality of SOC modules.

* * * * *

UNITED STATES PATENT AND TRADEMARK OFFICE
CERTIFICATE OF CORRECTION

| | | |
|---|---|---|
| PATENT NO. | : 7,039,819 B1 | Page 1 of 1 |
| APPLICATION NO. | : 10/426487 | |
| DATED | : May 2, 2006 | |
| INVENTOR(S) | : Steven J. Kommrusch et al. | |

It is certified that error appears in the above-identified patent and that said Letters Patent is hereby corrected as shown below:

Column No. 12, Line No. 57 change "sending clock" to --sending a clock--

Column No. 14, Line No. 41 change "au" to --all--

Column No. 14, Line No. 43 change "of" to --off--

Signed and Sealed this

Fifteenth Day of August, 2006

JON W. DUDAS
*Director of the United States Patent and Trademark Office*